United States Patent [19]

Siebrand et al.

[11] Patent Number: 4,958,566
[45] Date of Patent: Sep. 25, 1990

[54] BRAKING MECHANISM FOR ROTATING FLYING OBJECTS

[75] Inventors: Gerhard Siebrand, Quickborn; Bruno Stürzenbecher, Norderstedt, both of Fed. Rep. of Germany

[73] Assignee: Autoflug GmbH, Rellingen, Fed. Rep. of Germany

[21] Appl. No.: 282,029

[22] Filed: Dec. 9, 1988

[30] Foreign Application Priority Data

Dec. 10, 1987 [DE] Fed. Rep. of Germany ....... 3741779

[51] Int. Cl.$^5$ ............................................. F42B 10/56
[52] U.S. Cl. .................................. 102/400; 102/386; 244/3.27; 244/138 R
[58] Field of Search ............... 102/386, 387, 388, 400; 244/138 R, 142, 145, 3.27, 3.28

[56] References Cited

U.S. PATENT DOCUMENTS

| | | | |
|---|---|---|---|
| 2,450,926 | 10/1948 | Weinig | 244/145 |
| 2,494,600 | 1/1950 | Weinig | 244/145 |
| 4,005,655 | 2/1977 | Kleinschmidt et al. | |
| 4,565,341 | 1/1986 | Zacharin | |

FOREIGN PATENT DOCUMENTS 2058691 4/1981 United Kingdom ................ 244/145

Primary Examiner—Charles T. Jordan
Assistant Examiner—Richard W. Wendtland
Attorney, Agent, or Firm—Robert W. Becker & Associates

[57] ABSTRACT

A braking mechanism for a rotating flying object. The braking mechanism includes a planar fabric sheet having a central attachment base portion that can be secured to the flying object. The fabric sheet is adapted to be stored in a folded-up readiness state in the flying object, and, when released and unfolded, is adapted to form a braking surface that encircles the flying object. The braking mechanism further includes a plurality of reinforcing strips that each extend radially between the central attachment base portion and an outer rim of the braking mechanism and are distributed about the periphery of the latter. Each reinforcing strip extends from the central attachment base portion to the rim and back again to at least partially form two layers and to form loop-like pockets at the rim, with centrifugal weights being disposed in these pockets.

11 Claims, 2 Drawing Sheets

BRAKING MECHANISM FOR ROTATING FLYING OBJECTS

BACKGROUND OF THE INVENTION

The present invention relates to a braking mechanism for a rotating flying object i.e. a flying object that rotates about its axis, with the braking mechanism including a planar fabric sheet having a central attachment base portion that can be secured to the flying object. The fabric sheet is adapted to be stored in a folded-up readiness state in the flying object, and, when released and unfolded, is adapted to form a braking surface that encircles the flying object.

Such braking mechanisms are secured in a non slip manner on the flying objects, and are folded-up in a storage space provided on the flying object. When released, the braking mechanism is activated and opens, so that it unfolds about the rapidly rotating flying object and forms a braking surface as a resistance surface to the oncoming flow against the flying object; as a result of this effect, the speed of the flying object is reduced. Such braking mechanisms can fulfill their objective only if they can satisfactorily unfold under actual flight conditions and can form a stable surface that counteracts the effective pressure head.

It is therefore an object of the present invention to provide a braking mechanism of the aforementioned general type that assures a satisfactory unfolding into an essentially flat or extended position under all operating conditions; at the same time, it should be possible to reliably transfer to the securing elements of the braking mechanism in the flying object the centrifugal and extension forces that occur, so that damage to these parts that would render the braking mechanism non functional is reliably avoided.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
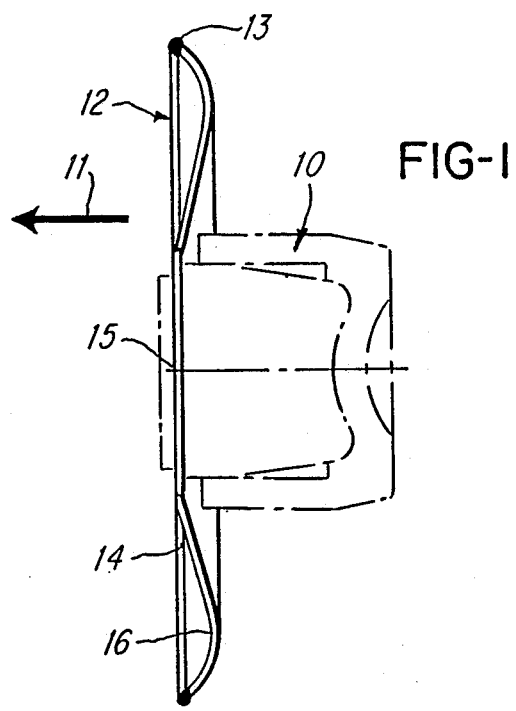
FIG. 1 is a side view showing one exemplary embodiment of the inventive braking mechanism unfolded from a flying object.

The braking mechanism of the present invention is characterized primarily by a plurality of reinforcing strips that each extend radially between the central attachment base portion and the outer rim of the braking mechanism and are distributed about the periphery of the latter, whereby each reinforcing strip extends from the attachment base to the rim and back to the attachment base to at least partially form two layers and to form loop-like pockets at the rim of the braking mechanism, with centrifugal weights being disposed in these pockets.

With the inventive braking mechanism, the radially extending reinforcing strips transfer the high centrifugal and extension forces that result from a rapid rotation of the flying object onto the attachment base of the braking mechanism on the flying object. The centrifugal weights that are provided where the reinforcing strips are looped about at the rim of the braking mechanism assure a configuration-giving extension and spreading-out of the braking mechanism; in this connection, the centrifugal weights are disposed in a stable manner in the loop-like pockets formed by the looped-around reinforcing strips. By providing the centrifugal weights, a surface-like configuration of the braking mechanism to withstand the high oncoming air pressure is also assured. Since the ends of the reinforcing strips, which extend radially ba? k and forth, have securing means extending therethrough in the region of the attachment base, and can be secured to the flying object along with the fabric sheet, a direct introduction of force onto the securing elements is effected, so that beyond the reinforcing strips, the fabric sheet is not subjected to any corresponding stressing due to the centrifugal weights.

Pursuant to one particularly advantageous specific embodiment of the present invention, each reinforcing strip extends back and forth in such a manner as to form a "V", with each reinforcing strip opening out at the attachment base in the crown portion of the braking mechanism, and in the rim portion of the braking mechanism being guided about a rim reinforcement that in this region extends about the periphery and then being guided back to the attachment base in such a way that the closed tip or end of the "V" is formed where the reinforcing strip is looped about the rim reinforcement of the braking mechanism, and the open legs of the "V" spread in the region of the attachment base. The V-like orientation of the reinforcing strips is symmetrically disposed relative to the respectively shortest line between the crown point and the rim portion of the braking mechanism.

This inventive arrangement has the particular advantage that the two legs of the respective reinforcing strip have two different points of securement, as a result of which a reliable stabilization of the position of the centrifugal weights disposed in the V-ends is provided without any pendulum action. Since a different securing element is associated with each leg end of a given reinforcing strip, a tangential approach of the reinforcing strips to the securing elements results, thereby advantageously improving the stabilization of the positioning of the centrifugal weights. Furthermore assured is a direct introduction of the centrifugal forces that originate from the weights during the elongation or spreading-out of the braking mechanism at high speed and during the entire effective time of the pressure head.

Pursuant to the present invention, the stable positioning and securing of the centrifugal weights is additionally improved by placing the centrifugal weights in the region of inter section or crossover between the rim reinforcements and the reinforcing strips that are looped thereabout; the centrifugal weights could also be prevented from flying or swinging out by laterally extending seams Pursuant to a preferred specific embodiment of the present invention, the fabric sheet of the braking mechanism has several corners, preferably five, with the reinforcing strips extending from the attachment base to these corners of the fabric sheet.

In summary, the present invention has the advantage that due to the orientation and the high strength of the reinforcing strips, there is assured a good introduction of force from the centrifugal weights at the corners to the securing means in the region of the attachment base of the braking mechanism, and the shearing-off of the fabric of the brake surface from the securement is prevented during the operating phase and during the substantial deformation during unfolding and opening-out of the braking mechanism under the effect of the rotation.

Further specific features of the present invention will be described in detail subsequently.

DESCRIPTION OF PREFERRED EMBODIMENTS

Referring now to the drawings in detail, illustrated in FIG. 1 is a flying object 10 that has a direction of flight indicated by the arrow 11. Shown at the front end of the flying object 10, when viewed in the direction of movement or flight, is a drag or braking mechanism 12 in the unfolded or open state, with this braking mechanism 12 initially being folded-up in a storage space. Two centrifugal weights 13 disposed on the outer rim of the braking mechanism 12 provide an appropriate configuration for the planar fabric sheet. Radially extending reinforcing strips 14 extend linearly between an attachment base 15 and the centrifugal weights 13, while the fabric portions 16 that are disposed between the reinforcing strips 14 are illustrated as having yielded in a bulging manner in conformity with the prevailing pressure head.

Figure 2:
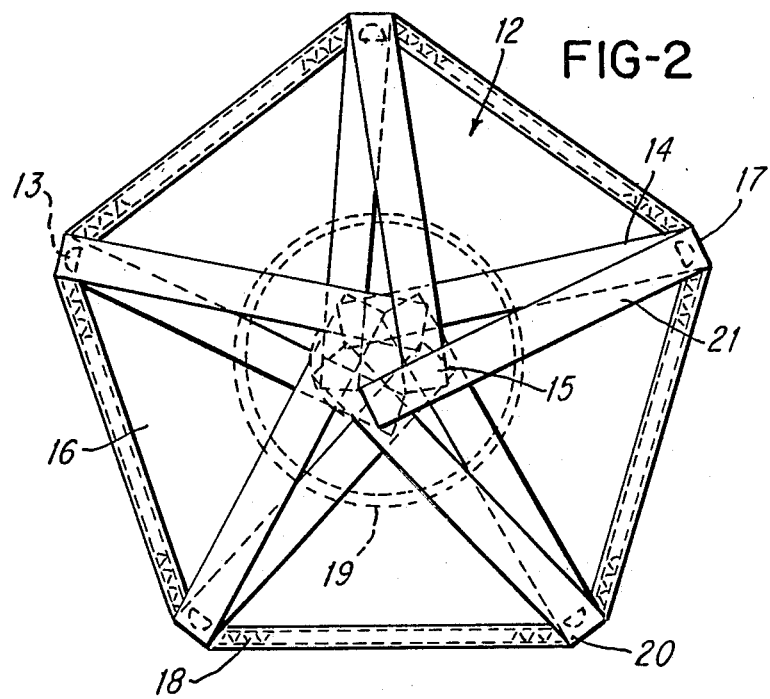
FIG. 2 is a plan view of one exemplary embodiment of the inventive braking mechanism.
Figure 3:
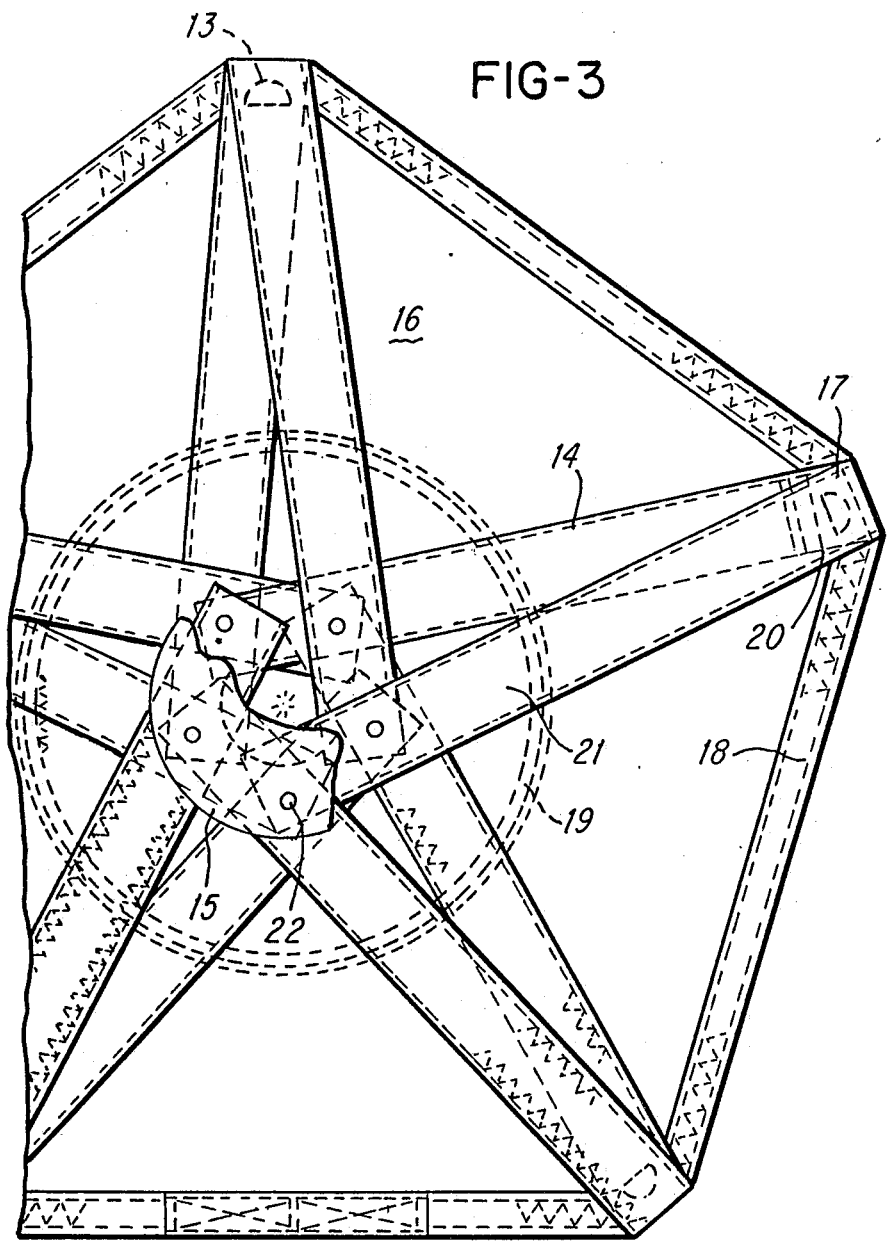
FIG. 3 is an enlarged partial view of the braking mechanism of FIG. 2.

As shown in the detailed views of FIGS. 2 an 3, with the illustrated embodiment the braking mechanism 12 has a five-cornered fabric sheet with corners 17. The reinforcing strips 14 are guided and reverse their direction at the corners 17, where the centrifugal weights 13 are also disposed. A rim reinforcement 18 borders the outer rim of the fabric sheet or braking mechanism 12; a dashed-line circular portion designates an inner reinforcement region 19, with the previously described attachment base 15 being a portion thereof.

The reinforcing strips 14 are guided from the attachment base 15 to the corners 17 of the braking mechanism 12 and back again in a V-shaped manner, with the point of the "V" being formed by looping the reinforcing strips 14 about the rim reinforcement 18. The centrifugal weights 13 are placed in the loop-like pockets formed by these points; these centrifugal weights 13 are prevented from flying out as a result of the high rotational velocity of the flying object 10 by being inserted under the rim reinforcement 18 or by additional side seams 20.

The legs 21 of the reinforcing strips 14 that are guided back and forth open in the region of the attachment base 15, where they are individually secured directly to the flying object 10 via securing means 22 that also extend through the fabric of the braking mechanism 12 in the region of the attachment base 15. Due to the geometry of the respective coordination of the ends of the legs 21 of the reinforcing strips 14, four legs 21 are always held by a given securing means 22, thus resulting in an appropriately well distributed load application and transfer. The legs 21 approach the securing means 22 tangentially, resulting in a two-point securement for each reinforcing strip 14, which assures a stable positioning of the pertaining centrifugal weight 13.

The present invention is, of course, in no way restricted to the specific disclosure of the specification and drawings, but also encompasses any modifications within the scope of the appended claims.

What we claim is:

1. A braking mechanism for centrally taking up load arising especially from a rotating flying object with such load being taken up by an apex of the braking mechanism involving problems distinguishable from problems encountered with a parachute that has load taken up along an outer edge of the parachute via lines therewith so that an apex of the parachute is in no way connected with load of any flying object, said braking mechanism including a planar fabric sheet having an outer rim and a central attachment base portion that can be secured to said flying object, with said fabric sheet being adapted to be stored in a folded-up readiness state in said flying object and, when released and unfolded, being adapted to form a braking surface that encircles said flying object; said braking mechanism further comprises:

a plurality of radial reinforcing strips that each extend radially between said central attachment base portion and said outer rim and are distributed about the periphery of said braking mechanism, whereby each of said reinforcing strips extends from said central attachment base portion to said outer rim and back to said central attachment base portion to at least partially form two layers and to form loop-like pockets at said outer rim of said fabric sheet of said braking mechanism, with centrifugal weights being disposed in said pockets, said central attachment base portion taking up load of the rotating flying object transmitted thereto via the braking surface that encircles said flying object and such load is thus transmitted to the apex of the braking mechanism.

2. A braking mechanism according to claim 1, in which each of said back-and-forth extending reinforcing strips has two end regions that are disposed remote from said outer rim, on said central attachment base portion, and are securable together with said fabric sheet to said flying object.

3. A braking mechanism according to claim 1, in which each of said back-and-forth extending reinforcing strips has a V-like orientation, with the tip of said V being disposed on said outer rim of said braking mechanism, and the open legs of said V ending in said central attachment base portion.

4. A braking mechanism according to claim 3, which includes securing means for securing said V-legs of said reinforcing strips to said flying object, with several V-legs of different ones of said reinforcing strips being disposed in a multi-layer arrangement and being held by a single securing means.

5. A braking mechanism according to claim 4, in which each of said V-legs of said reinforcing strips has a central, radially extending axis, with said V-legs extending tangentially from said securing means relative to said central, radially extending axis.

6. A braking mechanism according to claim 1, which includes a rim reinforcement that extends along said outer rim of said fabric sheet, with said reinforcing strips being looped about said rim reinforcement.

7. A braking mechanism according to claim 6, in which said centrifugal weights are held in said loop-like pockets by being wedged between said rim reinforcement and said reinforcing strips.

8. A braking mechanism according to claim 6, in which said fabric sheet is made of a textile material, and said reinforcing strips and said rim reinforcement are made of a high-strength fabric.

9. A braking mechanism according to claim 1, in which said loop-like pockets are provided with lateral closure seams to hold said centrifugal weights.

10. A braking mechanism according to claim 1, in which said fabric sheet is a uniform, multi-cornered sheet, with said reinforcing strips changing their direction of extension at said corners.

11. A braking mechanism according to claim 10, in which said fabric sheet has five corners.

* * * * *